(12) United States Patent
Dong et al.

(10) Patent No.: US 11,601,850 B2
(45) Date of Patent: *Mar. 7, 2023

(54) SYSTEMS AND METHODS FOR ALLOCATING NETWORK RESOURCES UTILIZING BEARER INFORMATION

(71) Applicant: Verizon Patent and Licensing Inc., Basking Ridge, NJ (US)

(72) Inventors: Yuexin Dong, Bridgewater, NJ (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 275 days.

This patent is subject to a terminal disclaimer.

(21) Appl. No.: 16/949,385

(22) Filed: Oct. 28, 2020

(65) Prior Publication Data
US 2021/0045016 A1    Feb. 11, 2021

Related U.S. Application Data

(63) Continuation of application No. 16/401,739, filed on May 2, 2019, now Pat. No. 10,849,025.

(51) Int. Cl.
*H04L 1/00*      (2006.01)
*H04W 28/24*    (2009.01)
*H04W 28/02*    (2009.01)
*H04W 72/12*    (2023.01)
*H04L 47/2441*  (2022.01)
*H04W 72/10*    (2009.01)

(52) U.S. Cl.
CPC ......... *H04W 28/24* (2013.01); *H04L 47/2441* (2013.01); *H04W 28/0268* (2013.01); *H04W 72/10* (2013.01); *H04W 72/1242* (2013.01)

(58) Field of Classification Search
None
See application file for complete search history.

(56) References Cited

U.S. PATENT DOCUMENTS

| | | | |
|---|---|---|---|
| 10,849,025 B1 * | 11/2020 | Dong | H04W 72/1236 |
| 2019/0297634 A1 * | 9/2019 | Dai | H04W 28/16 |
| 2020/0029242 A1 * | 1/2020 | Andrews | H04W 28/0268 |
| 2020/0205176 A1 * | 6/2020 | Yu | H04W 72/042 |

\* cited by examiner

*Primary Examiner* — Clemence S Han

(57) ABSTRACT

A base station may obtain information associated with a bearer established for a communication session involving a user equipment. The bearer may be associated with a quality of service (QoS) flow of a network slice and the information may include a QoS flow identifier, a QoS configuration identifier associated with a QoS that is to be provided for communications associated with the QoS flow, and a network slice identifier. The base station may determine a scheduling weight for the bearer based on the QoS flow identifier, the QoS configuration identifier, and the network slice identifier. The base station may cause resources to be allocated to the bearer according to the scheduling weight.

20 Claims, 7 Drawing Sheets

SYSTEMS AND METHODS FOR ALLOCATING NETWORK RESOURCES UTILIZING BEARER INFORMATION

RELATED APPLICATION

This application is a continuation of U.S. patent application Ser. No. 16/401,739, entitled "SYSTEMS AND METHODS FOR ALLOCATING NETWORK RESOURCES UTILIZING BEARER INFORMATION," filed May 2, 2019, which is incorporated herein by reference.

BACKGROUND

5G/New Radio (5G/NR) is a next generation air interface for global wireless usage. 5G/NR provides various enhancements to wireless communications, such as flexible bandwidth allocation, improved spectral efficiency, ultra-reliable low-latency communications (URLLC), beamforming, high-frequency communications (e.g., millimeter wave (mmWave)), and/or the like.

DETAILED DESCRIPTION OF PREFERRED EMBODIMENTS

Figure 1A:
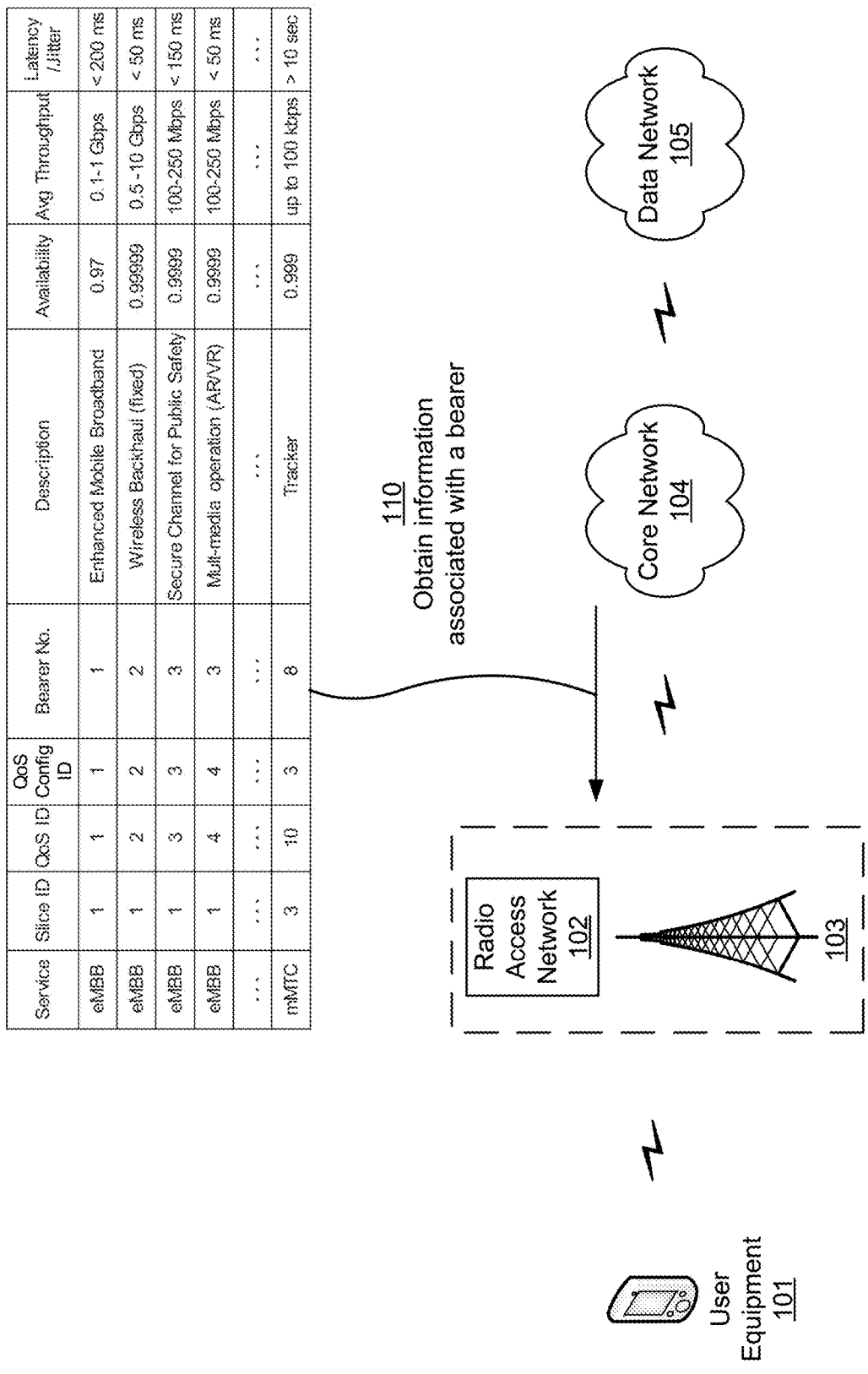
FIGS. 1A-1D are diagrams of one or more example implementations described herein.

The following detailed description of example implementations refers to the accompanying drawings. The same reference numbers in different drawings may identify the same or similar elements.

In a wireless telecommunications system, such as a 5G wireless telecommunications network, network slicing allows for multiple virtual networks to run on a single physical network to support multiple services, applications, and/or entities (e.g., end users, customers, such as organizations that provide a service to end users of the wireless telecommunications system, and/or the like). In some instances, when a user equipment (UE) requests a connection (e.g., protocol data unit (PDU) connectivity) to the network for an application and/or service, the UE provides the network with information associated with the UE, the application, and/or the service. Such information can include a single network slice selection assistance information (S-NSSAI) that identifies a network slice associated with the UE. For example, an S-NSSAI can identify a slice/service type (SST) of the network slice (e.g., an enhanced mobile broadband (eMBB) service, an ultra-reliable, low-latency (URLLC) service, a massive Internet of Things (mIoT) service, a massive machine-type communication (mMTC) service, and/or the like) for a communication session involving the UE.

Based on the application and/or the service identified in the information provided by the UE, the network may establish a bearer (e.g., a data radio bearer (DRB)) for a communication session involving the UE. For example, the network may establish the bearer according to a particular quality of service (QoS) that is to be provided for a data flow of the communication session. Such a data flow, that is to receive a particular QoS, can be referred to as a QoS flow. A QoS flow may be identified by a particular identifier, such as a QoS flow identifier (QFI). In addition, a QoS that is to be provided for communications associated with the QoS flow may be identified by a QoS configuration identifier (e.g., a 5G QoS identifier (5QI)). A QFI and QoS configuration identifier (e.g., 5QI) for a QoS flow may be communicated, within QoS information, to one or more devices (e.g., a UE, a base station, a user plane function (UPF), and/or the like) of the wireless telecommunications system to indicate that communications associated with that QoS flow are to receive a QoS as described in the QoS information.

The bearer established by the network may be associated with a network slice (e.g., based on an S-NSSAI included in the information provided by the UE). According to current techniques, the bearer may be allocated resources of the network that are reserved for the network slice. For example, according to current techniques, communications associated with the network slice are constrained to a bandwidth range assigned to the network slice. As a result, available bandwidth of the network is used inefficiently. For example, when network utilization is low, communications associated with the network slice cannot take advantage of an available bandwidth of the network in excess of a bandwidth assigned to the network slice. Accordingly, current techniques may cause network congestion and may reduce throughput, thereby resulting in a QoS for a UE that does not meet a service level agreement (SLA) associated with the UE and/or resulting in a poor user experience for a user of the UE.

Moreover, according to current techniques, when a new network slice is configured for the network, network slice resource assignments must be updated to account for the new network slice. This may cause disruptions to services of the network and may waste computing resources (e.g., processing resources, memory resources, and/or the like) associated with determining and configuring updated network slice resource assignments.

Some implementations described herein provide improved resource management for communications associated with network slices. For example, a bearer established for a communication session may be assigned a scheduling weight according to a weighting function. The weighting function may determine the scheduling weight according to values for a QFI, a QoS configuration identifier, and a network slice identifier associated with the bearer. Resources may be allocated to the bearer according to the scheduling weight. In addition, the weighting function may be tuned according to data relating to resource utilization and/or user experience to improve the weighting function.

In this way, the weighting function facilitates an efficient utilization of resources that takes into account a network slice associated with a bearer. For example, when network utilization is low, any available resources can be allocated to the bearer. Moreover, the efficient utilization of resources facilitated by the weighting function improves QoS and user experience by providing improved throughput and availability.

In addition, the weighting function facilitates resource management for a new network slice configured for the network. For example, the weighting function eliminates a need for an initial configuration procedure in which resources for a new network slice are determined and reserved, thereby conserving computing resources (e.g., processing resources, memory resources, and/or the like).

FIGS. 1A-1D are diagrams of one or more example implementations 100 described herein. As shown in FIGS. 1A-1D, example implementation(s) 100 illustrates various portions of a wireless telecommunications system (referred to herein as a "network"), which in some implementations may be a 5G wireless telecommunications system, a 4G wireless telecommunications system, a long-term evolution (LTE) wireless telecommunications system, an LTE-Advanced (LTE-A) wireless telecommunications system, and/or the like.

As shown in FIGS. 1A-1D, example implementation(s) 100 may include a UE 101 wirelessly connected to a radio access network (RAN) 102 at a base station 103, which is connected to a data network 105 via a core network 104. UE 101 may run an application that involves communicating with data network 105, and therefore UE 101 may enter into a communication session (e.g., a PDU session) with data network 105 via RAN 102 and core network 104. UE 101 and core network 104 may communicate application-specific data during the communication session. In some implementations, to permit UE 101 to enter into the communication session with data network 105, UE 101 may send an initial request to register with core network 104.

Core network 104 may establish a bearer (e.g., a DRB) for the communication session of UE 101 according to a QoS and/or a network slice associated with the communication session. Accordingly, the bearer may be associated with QoS information (e.g., a QFI and a QoS configuration identifier (e.g., a 5QI)) and network slice information (e.g., a network slice identifier, such as an S-NSSAI or an SST). Core network 104 may provide information associated with the bearer (e.g., the QoS information and/or the network slice information) to base station 103 via a message (e.g., a bearer setup request).

As shown in FIG. 1A, and by reference number 110, base station 103 may obtain information associated with a bearer. For example, base station 103 may obtain information associated with a bearer established for a communication session involving UE 101. As described above, the information may include QoS information and network slice information. In some implementations, the information may be a mapping of a bearer to the QoS information (e.g., QFI and 5QI) and the network slice information (e.g., S-NSSAI).

The QoS information may include a QFI and a QoS configuration identifier (e.g., a 5QI). The QFI and the QoS configuration identifier each may be a numeric value. The QFI may identify a QoS flow of a communication session of UE 101. The QoS configuration identifier may identify one or more QoS parameters of the QoS flow, such as resource type (e.g., guaranteed bit rate (GBR) or non-guaranteed bit rate (non-GBR)), priority level, packet delay budget, packet error loss rate, maximum data burst volume, averaging window, and/or example services of the QoS flow.

The network slice information may include a network slice identifier, such as an S-NSSAI. The S-NSSAI may be a numeric value. The S-NSSAI may identify an SST that defines an expected behavior of a network slice according to features (e.g., latency, bitrate, average availability, average throughput, and/or the like) and/or services (e.g., eMBB, URLLC, mIoT, mMTC, and/or the like) of the network slice.

Figure 1B:
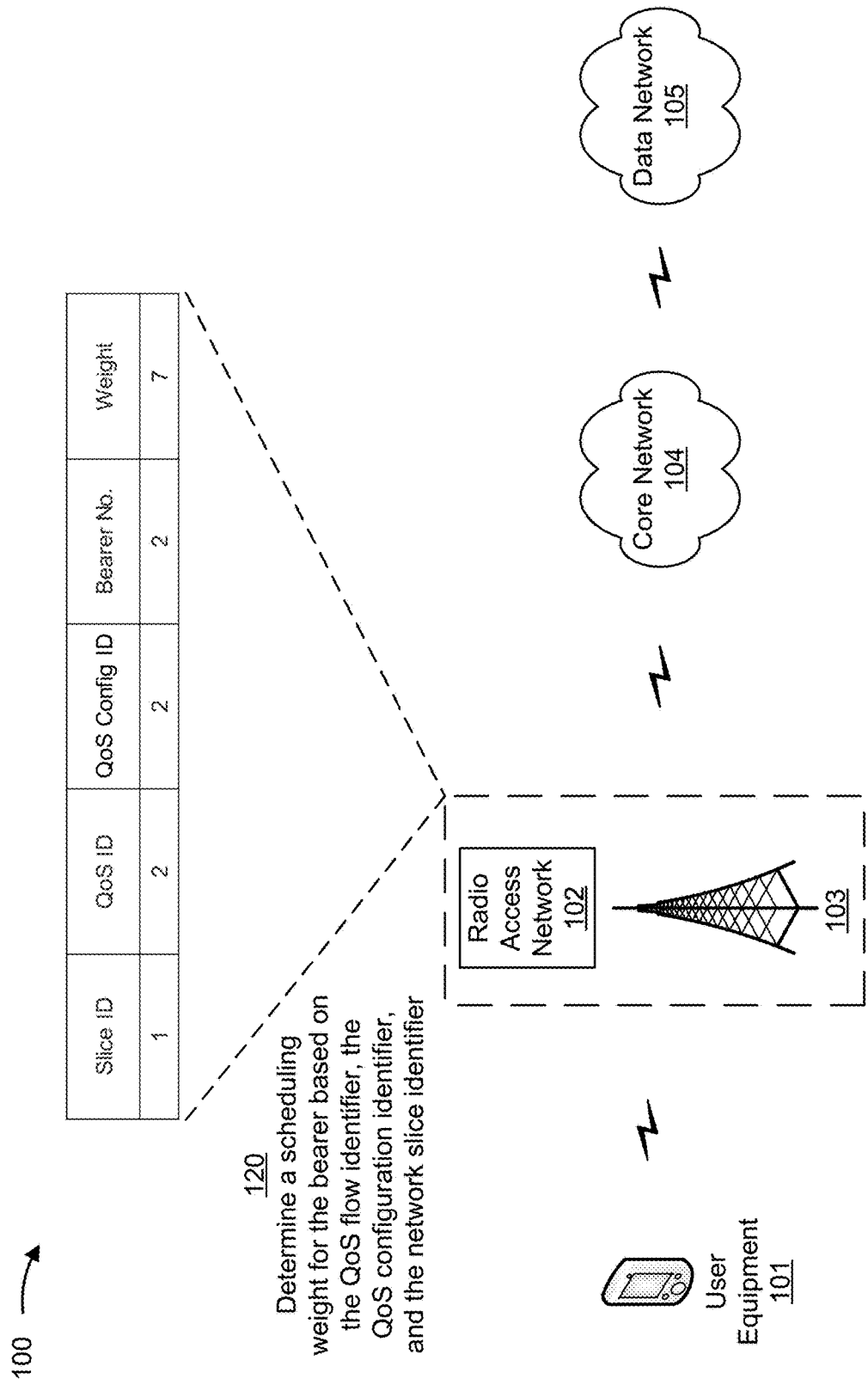

As shown in FIG. 1B, and by reference number 120, base station 103 may determine a scheduling weight for the bearer based on the information associated with the bearer. Base station 103 may determine a scheduling weight for the bearer using a weighting function. In some implementations, base station 103 may determine the scheduling weight for the bearer (e.g., using the weighting function) based on the QoS information and the network slice information. For example, base station 103 may determine the scheduling weight for the bearer (e.g., using the weighting function) based on a QFI, a 5QI, and an S-NSSAI associated with the bearer. In such a case, the weighting function may receive, as an input, the QFI, the 5QI, and the S-NSSAI, and provide, as an output, a scheduling weight. For example, base station 103 may provide a QFI, a 5QI, and an S-NSSAI (e.g., QFI=2, 5QI=8, and S-NSSAI=1) to the weighting function, and obtain a scheduling weight from the weighting function (e.g., scheduling weight=10).

In this way, the scheduling weight is determined as a function of the QFI, the 5QI, and the S-NSSAI (e.g., scheduling weight=f(QFI, 5QI, S-NSSAI)) so that a combination of a QoS flow and a network slice associated with the bearer dictates the scheduling weight. Accordingly, resources can be allocated in a manner that takes into account the network slice associated with the bearer.

In some implementations, base station 103 may determine the scheduling weight (e.g., using the weighting function) based on information other than, or in addition to, the QFI, the 5QI, and/or the S-NSSAI. For example, base station 103 may determine the scheduling weight based on an SST, a service identifier, an application identifier, a priority identifier (e.g., a QoS flow priority identifier, a network slice priority identifier, and/or the like), a UE identifier, a customer identifier, and/or the like.

Base station 103, or another component of the network (e.g., core network 104), may use one or more artificial intelligence techniques, such as machine learning, deep learning, and/or the like to determine the weighting function. For example, a self-organizing network (SON) function of the network may be used to determine the weighting function. The SON function may be associated with core network 104, an edge domain of the network, and/or RAN 102 (e.g., base station 103 of RAN 102).

The SON function may determine a weighting function based on QoS information (e.g., QFI and 5QI) and network slice information (e.g., S-NSSAI), as described herein. For example, using associations between QFI, 5QI, and S-NSSAI values (e.g., a particular combination of QFI, 5QI, and S-NSSAI values) of a bearer and a resulting QoS, quality of experience (QoE), resource utilization, and/or the like associated with the bearer, the SON function may determine a weighting function that is to output a scheduling weight based on QFI, 5QI, and S-NSSAI values (e.g., a particular combination of QFI, 5QI, and S-NSSAI values).

In this case, the SON function may generate a model for determining a weighting function. For example, the SON function may train a model using information that includes a plurality of associations between QFI, 5QI, and/or S-NSSAI values and QoS, QoE, and/or resource utilization. The SON function may perform a training operation when generating the model. For example, the SON function may apportion QFI, 5QI, and/or S-NSSAI values into a training set (e.g., a set of data to train the model), a validation set (e.g., a set of data used to evaluate a fit of the model and/or to fine tune the model), a test set (e.g., a set of data used to evaluate a final fit of the model), and/or the like. Additionally, or alternatively, the SON function may train the model using a supervised training procedure that includes receiving input (e.g., input relating to associations between QFI, 5QI, and/or S-NSSAI values and QoS, QoE, and/or resource utilization) to the model from a subject matter expert.

In some implementations, the SON function may use one or more other model training techniques, such as a neural network technique. For example, the SON function may perform an artificial neural network processing technique (e.g., using a two-layer feedforward neural network architecture, a three-layer feedforward neural network architecture, and/or the like) to perform pattern recognition with regard to patterns of associations between QFI, 5QI, and/or S-NSSAI values and QoS, QoE, and/or resource utilization. In this case, using the artificial neural network processing technique may improve an accuracy of a model generated by the SON function by being more robust to noisy, imprecise, or incomplete data, and by enabling the SON function to detect patterns and/or trends undetectable to human analysts or systems using less complex techniques.

In some implementations, the model for determining the weighting function may be generated, trained, and/or implemented by another device and/or function (e.g., a network data analytics function (NWDAF)) of the network. Additionally, the model for determining the weighting function may be generated and/or trained by a device outside of the network and provided to base station 103 (e.g., the SON function of base station 103), core network 104, or another component of the network.

Figure 1C:
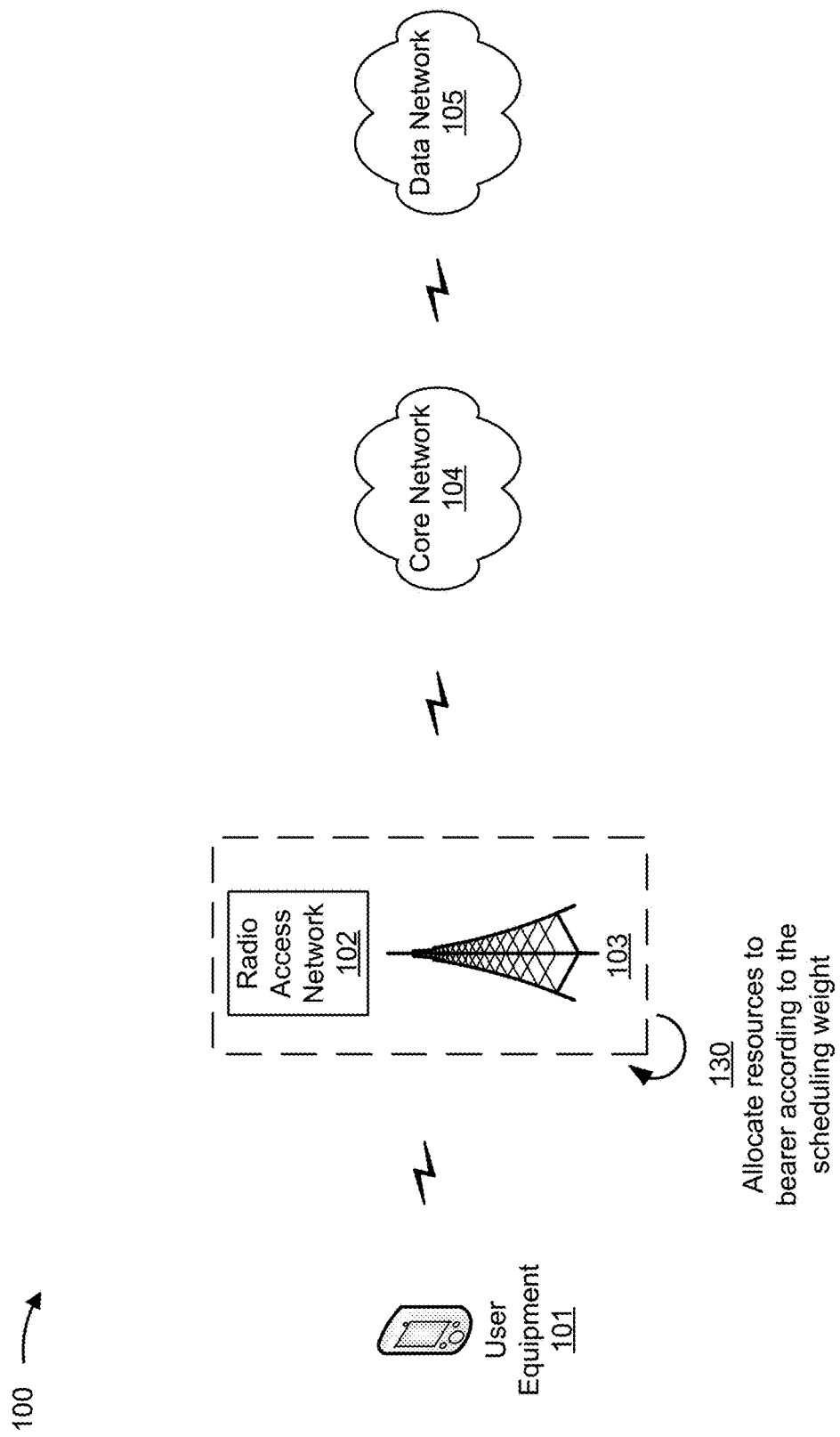

As shown in FIG. 1C, and by reference number 130, base station 103 may allocate resources to the bearer (e.g., allocate resources to communications of UE 101 transmitted and/or received via the bearer) according to the scheduling weight. For example, base station 103 may provide the scheduling weight to a scheduler of base station 103 to permit the scheduler to allocate resources to the bearer according to the scheduling weight. The scheduling weight permits the scheduler to allocate resources to the bearer in a way that accounts for a QoS flow and a network slice associated with the bearer.

Base station 103 (e.g., a scheduler of base station 103) may maintain a mapping of a plurality of bearers to a plurality of scheduling weights. Base station 103 may use the mapping to determine an allocation of resources among the plurality of bearers. A higher scheduling weight for a first bearer may indicate a greater likelihood that resources will be allocated to the first bearer relative to a second bearer with a lower scheduling weight. For example, base station 103 (e.g., a scheduler of base station 103) may determine that a first scheduling weight of a first bearer is greater than a second scheduling weight of a second bearer and thereby determine a priority for the first bearer relative to the second bearer. Continuing with the previous example, base station 103 (e.g., a scheduler of base station 103) may allocate resources to the first bearer before allocating resources to the second bearer based on the priority and/or allocate more resources to the first bearer than allocated to the second bearer based on the priority. A first bearer may be associated with a first UE and a second bearer may be associated with the first UE or a second UE.

In some implementations, an amount of resources allocated to a bearer is based on the scheduling weight (e.g., equivalent to the scheduling weight, a multiple of the scheduling weight, a fraction of the scheduling weight, and/or the like). For example, if a bearer is given a scheduling weight of "5," base station 103 (e.g., a scheduler of base station 103) may allocate 5 MHz of bandwidth to the bearer (e.g., a bandwidth equivalent to the scheduling weight), may allocate 10 MHz of bandwidth to the bearer (e.g., a bandwidth that is a multiple of the scheduling weight), may allocated 2.5 MHz of bandwidth to the bearer (e.g., a bandwidth that is a fraction of the scheduling weight), and/or the like.

Figure 1D:
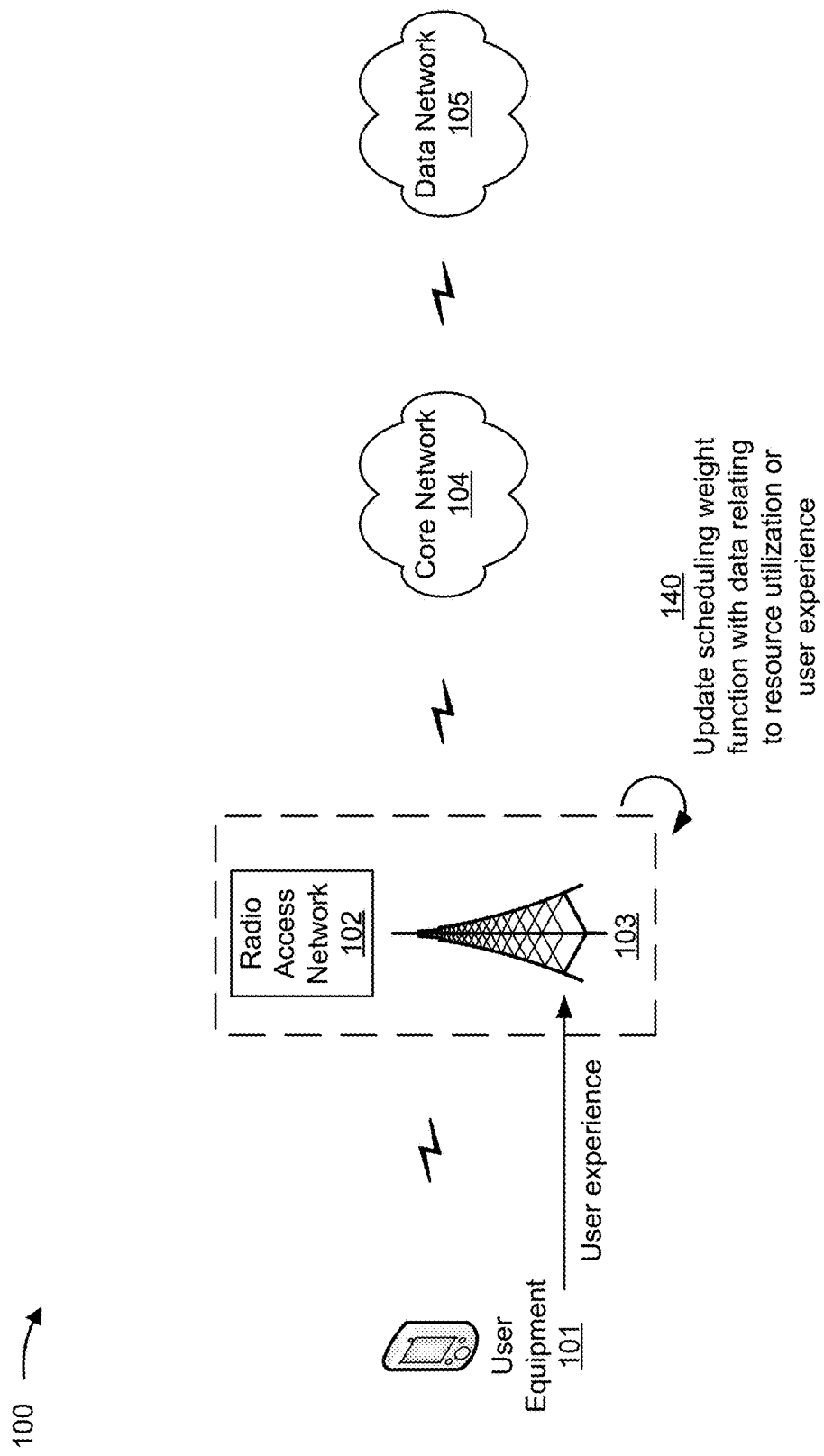

As shown in FIG. 1D, and by reference number 140, base station 103, or another component of the network, may update (e.g., tune) the weighting function. For example, a SON function, as described above, of base station 103, or another component of the network, may update the weighting function. The SON function may update the weighting function based on data relating to QoS, user experience (e.g., QoE), and/or resource utilization of the network.

Base station 103, or another component of the network (e.g., using the SON function), may obtain the data relating to user experience from UE 101. The data relating to user experience may include data (e.g., time series data) relating to one or more performance indicators (e.g., key performance indicators (KPI), such as KPIs relating to an application and/or a service associated with UE 101). For example, the performance indicators may relate to a throughput, a latency, a connection rate, a drop rate, and/or the like that was experienced by UE 101 in connection with an application and/or a service.

Base station 103, or another component of the network (e.g., using the SON function), may determine a QoE based on the data relating to user experience (e.g., based on whether values for one or more KPIs satisfy a respective threshold value, such as a threshold value indicated in an SLA). In some implementations, the data relating to user experience may indicate a level of user experience (e.g., on a scale from 0-10, a scale from 0-100, and/or the like) that is provided by a user of UE 101 (e.g., in response to a request transmitted by base station 103). In such a case, base station 103, or another component of the network (e.g., using the SON function), may determine a QoE based on the level of user experience provided by the user.

Based on the data relating to user experience and/or the QoE, base station 103, or another component of the network (e.g., using the SON function), may update the weighting function. For example, if a poor QoE is indicated (e.g., an SLA of UE 101 is not met), base station 103, or another component of the network (e.g., using the SON function), may update the weighting function so that the weighting function is to output a higher scheduling weight for the QoS information and/or network slice information (e.g., a particular combination of QFI, 5QI, and S-NSSAI values) associated with the bearer established for UE 101 (e.g., the bearer associated with the poor QoE).

Base station 103, or another component of the network (e.g., using the SON function), may obtain the data relating to resource utilization from base station 103 (e.g., a scheduler of base station 103). The data relating to resource utilization may indicate whether the network experienced a high load (e.g., relative to a threshold value) or a low load (e.g., relative to the threshold value) of traffic associated with a particular QoS flow and/or network slice (e.g., as measured over a time period or at an instantaneous measurement).

Base station 103, or another component of the network (e.g., using the SON function), may update the weighting function based on the data relating to resource utilization. For example, if the data relating to resource utilization indicates a high load on a particular network slice, base station 103, or another component of the network (e.g., using the SON function), may update the weighting function so that the weighting function is to output a higher scheduling weight for network slice information (e.g., S-NSSAIs) associated with the particular network slice. As another example, if the data relating to resource utilization indicates a low load on a particular QoS flow, base station 103, or another component of the network (e.g., using the SON function), may update the weighting function so that the weighting function is to output a lower scheduling weight for QoS information (e.g., QFIs and/or 5QIs) associated with the particular QoS flow.

Base station 103, or another component of the network (e.g., using the SON function) may use one or more artificial intelligence techniques, such as machine learning, deep learning, and/or the like to update the weighting function in a manner similar to that described above. For example, base station 103, or another component of the network (e.g., using the SON function) may tune the model, described above, using the data relating to user experience and/or the data relating to resource utilization. In this way, the weighting function is improved over time, thereby further improving an ability of base station 103 (e.g., a scheduler of base station 103) to allocate radio resources efficiently.

As indicated above, FIGS. 1A-1D are provided merely as examples. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
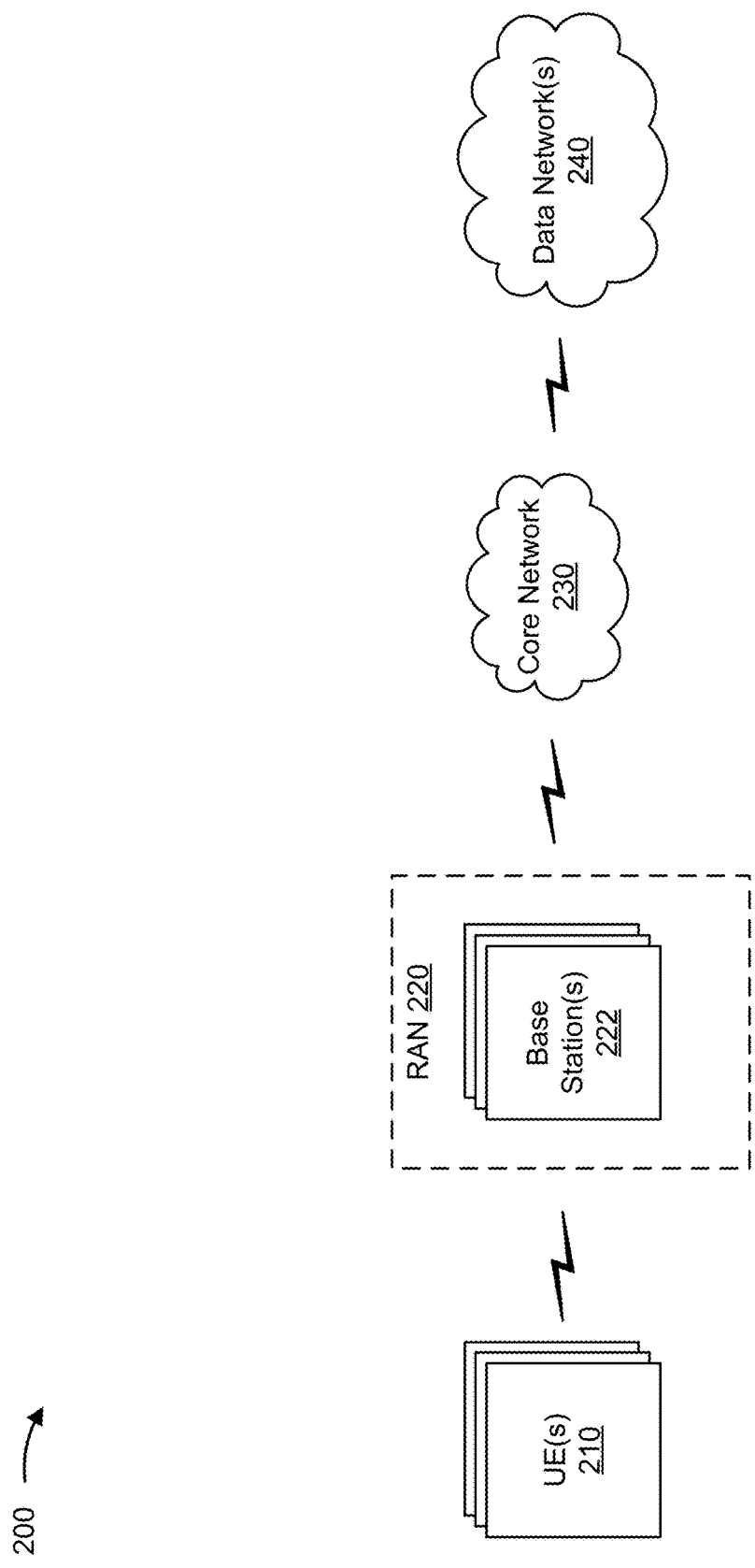
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a UE 210, a RAN 220, a base station 222, a core network, 230, and a data network 240. Devices of environment 200 may interconnect via wired connections, wireless connections, or a combination of wired and wireless connections.

UE 210 includes one or more devices capable of communicating with RAN 220 and/or a data network 240 (e.g., via core network 230). For example, UE 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 210 may be capable of communicating using uplink (e.g., UE to RAN) communications, downlink (e.g., RAN to UE) communications, and/or sidelink (e.g., UE-to-UE) communications. In some implementations, UE 210 may include a machine-type communication (MTC) UE, such as an evolved or enhanced MTC (eMTC) UE. In some implementations, UE 210 may include an Internet of things (IoT) UE, such as a narrowband IoT (NB-IoT) UE and/or the like.

RAN 220 includes one or more devices capable of communicating with UE 210 using a cellular radio access technology (RAT). For example, RAN 220 may include a base station 222, a base transceiver station, a radio base station, a node B, an evolved node B (eNB), a next generation node B (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 222 has the same characteristics and functionality of RAN 220, and vice versa. RAN 220 may transfer traffic between UE 210 (e.g., using a cellular RAT), one or more other RANs 220 (e.g., using a wireless interface or a backhaul interface, such as a wired backhaul interface), and/or core network 230. RAN 220 may provide one or more cells that cover geographic areas. Some RANs 220 may be mobile base stations. Some RANs 220 may be capable of communicating using multiple RATs.

In some implementations, RAN 220 may perform scheduling and/or resource management for UEs 210 covered by RAN 220 (e.g., UEs 210 covered by a cell provided by RAN 220). In some implementations, RAN 220 may be controlled or coordinated by a network controller, which may perform load balancing, network-level configuration, and/or the like. The network controller may communicate with RAN 220 via a wireless or wireline backhaul. In some implementations, RAN 220 may include a network controller, a SON module or component, or a similar module or component. In other words, RAN 220 may perform network control, scheduling, and/or network management functions (e.g., for other RAN 220 and/or for uplink, downlink, and/or sidelink communications of UEs 210 covered by RAN 220). In some implementations, RAN 220 may apply network slice policies to perform the network control, scheduling, and/or network management functions. In some implementations, RAN 220 may include a central unit and multiple distributed units. The central unit may coordinate access control and communication with regard to the multiple distributed units. The multiple distributed units may provide UEs 210 and/or other RANs 220 with access to data network 240 via core network 230.

Core network 230 may include various types of core network architectures, such as a 5G Next Generation (NG) Core, an LTE Evolved Packet Core (EPC), and/or the like. In some implementations, core network 230 may be implemented on physical devices, such as a gateway, a mobility management entity, and/or the like. In some implementations, the hardware and/or software implementing core network 230 may be virtualized (e.g., through the use of network function virtualization and/or software-defined networking), thereby allowing for the use of composable infrastructure when implementing core network 230. In this way, networking, storage, and compute resources may be allocated to implement functions of core network 230 in a flexible manner as opposed to relying on dedicated hardware and software to implement these functions.

Data network 240 includes one or more wired and/or wireless data networks. For example, data network 240 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
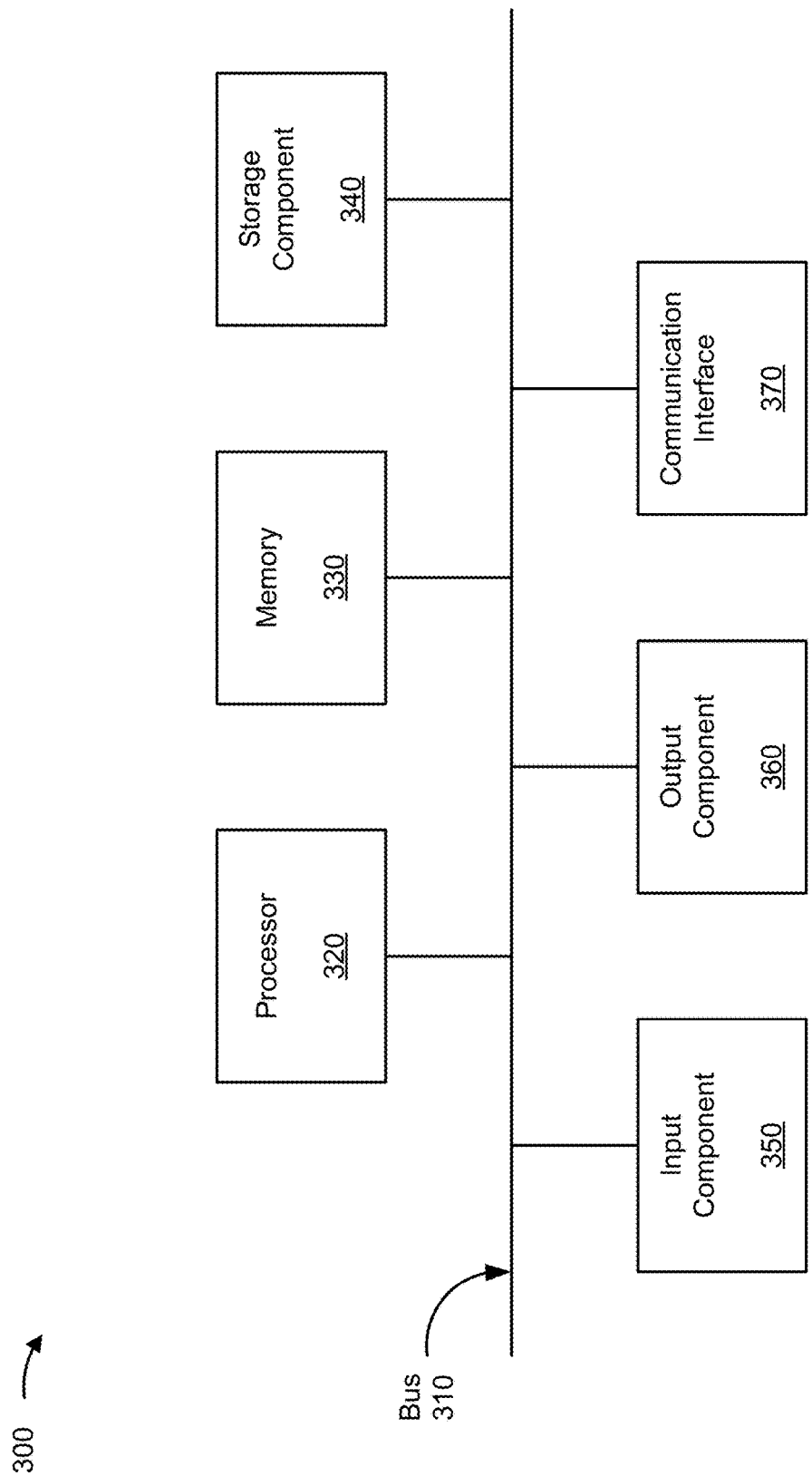
FIG. 3 is a diagram of example components of one or more devices of FIG. 2.

FIG. 3 is a diagram of example components of a device 300. Device 300 may correspond to, or may implement, UE 210, base station 222 of RAN 220, one or more functional elements or devices of core network 230, and/or a device of data network 240. In some implementations, UE 210, base station 222 of RAN 220, one or more functional elements or devices of core network 230, and/or a device of data network 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
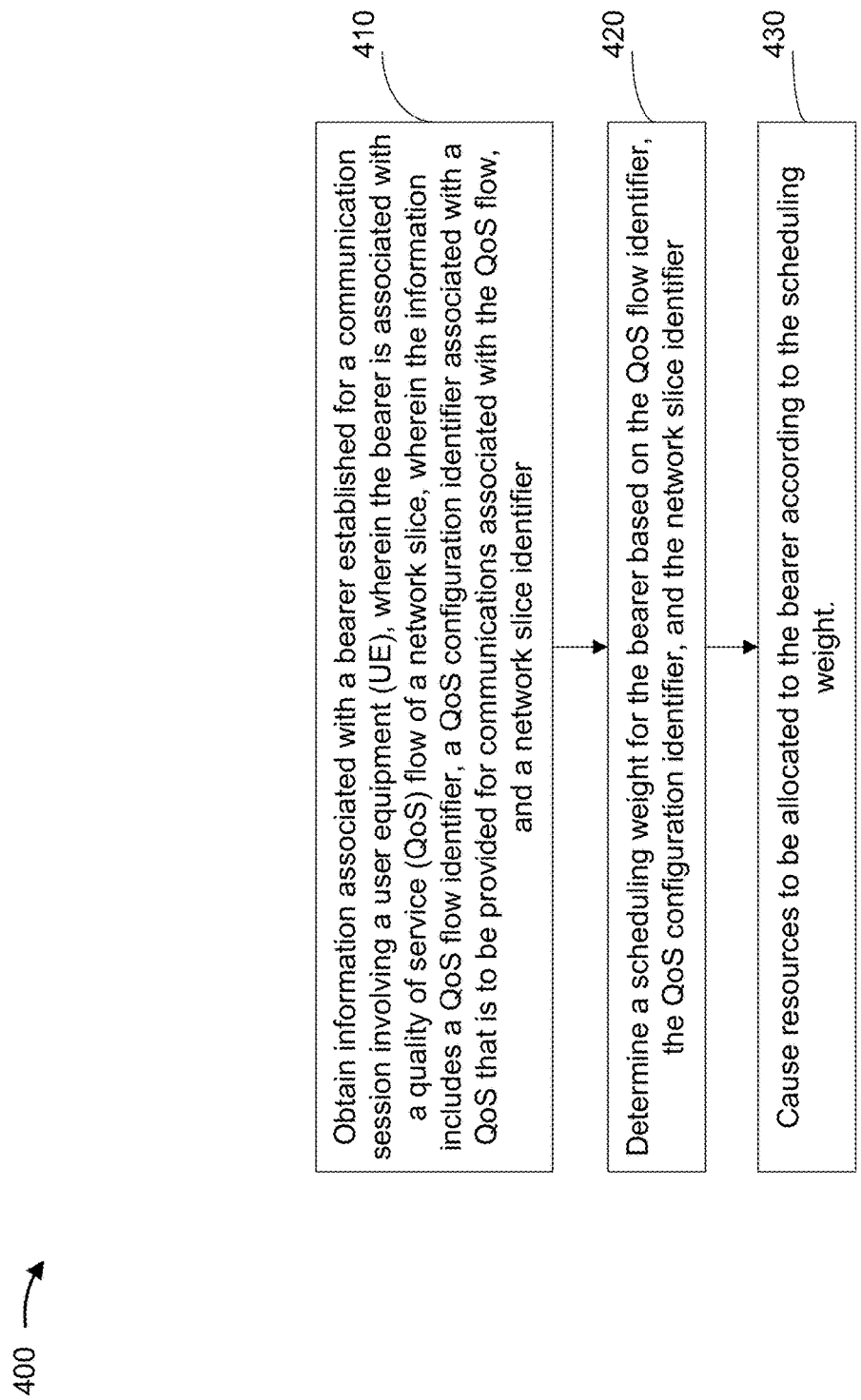
FIG. 4 is a flow chart of an example process for allocating network resources utilizing bearer information.

FIG. 4 is a flow chart of an example process 400 for allocating network resources utilizing bearer information. In some implementations, one or more process blocks of FIG. 4 may be performed by a base station (e.g., base station 222). In some implementations, one or more process blocks of FIG. 4 may be performed by another device or a group of devices separate from or including the base station, such as UE 210, core network 230, data network 240, and/or the like.

As shown in FIG. 4, process 400 may include obtaining information associated with a bearer established for a communication session involving a UE, wherein the bearer is associated with a QoS flow of a network slice, and wherein the information includes a QoS flow identifier, a QoS configuration identifier associated with a QoS that is to be provided for communications associated with the QoS flow, and a network slice identifier (block 410). For example, the base station (e.g., using processor 320, memory 330, storage component 340, input component 350, communication interface 370, and/or the like) may obtain information associated with a bearer established for a communication session involving a user equipment (UE), as described above.

The bearer may be associated with a QoS flow of a network slice. For example, the bearer may be a data radio bearer. The QoS configuration identifier may correspond to one or more of an availability, an average throughput, or a latency associated with the QoS flow. In addition, the network slice identifier may correspond to one or more of an availability, an average throughput, or a latency associated with the network slice. For example, the network slice identifier may correspond to an S-NSSAI. The information may be obtained from a mapping of the bearer to the QoS flow identifier, the QoS configuration identifier, and the network slice identifier.

As further shown in FIG. 4, process 400 may include determining a scheduling weight for the bearer based on the QoS flow identifier, the QoS configuration identifier, and the network slice identifier (block 420). For example, the base station (e.g., using processor 320, memory 330, storage component 340, and/or the like) may determine a scheduling weight for the bearer based on the QoS flow identifier, the QoS configuration identifier, and the network slice identifier, as described above. In some implementations, the base station, when determining the scheduling weight, may determine the scheduling weight using a weighting function. The weighting function may be an output of a model, such as a machine learning model. The model may be tuned according to resource utilization data and/or user experience data, as described below.

As further shown in FIG. 4, process 400 may include causing resources to be allocated to the bearer according to the scheduling weight (block 430). For example, the base station (e.g., using processor 320, memory 330, storage component 340, and/or the like) may cause resources to be allocated to the bearer according to the scheduling weight, as described above. In some implementations, the base station may allocate resources to the bearer according to the scheduling weight.

A higher scheduling weight for a first bearer may indicate a greater likelihood that resources will be allocated to the first bearer relative to a second bearer associated with a lower scheduling weight. For example, the base station, when allocating resources, may determine that a first scheduling weight associated with a first bearer is greater than a second scheduling weight associated with a second bearer, determine a priority for the first bearer relative to the second bearer, and allocate resources to the first bearer before allocating resources to the second bearer based on the priority.

Furthermore, the base station may obtain, after allocating resources to the bearer, first data relating to a user experience associated with the communication session or second data relating to a resource utilization of the QoS flow. The base station may update a weighting function (e.g., a weighting function used to determine the scheduling weight) based on the first data or the second data. The first data relating to the user experience may identify whether the QoS was provided for the communications associated with the QoS flow. In addition, the second data relating to the resource utilization may identify a load on the QoS flow. The base station may update the weighting function, using a model, according to resource utilization data and user experience data.

Process 400 may include additional implementations, such as any single implementation or any combination of implementations described above and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  obtaining, by a device, information associated with a bearer established for a communication session involving a user equipment (UE),
  determining, by the device, a scheduling weight for the bearer based on the information,
    wherein the information includes a quality of service (QoS) flow identifier of a QoS flow, a QoS configuration identifier that identifies one or more QoS parameters of the QoS flow, and a network slice identifier; and
  causing, by the device, resources to be allocated to the bearer according to the scheduling weight.

2. The method of claim 1, wherein the bearer is a first bearer, and
   wherein a higher scheduling weight for the first bearer indicates a greater likelihood that resources will be allocated to the first bearer relative to a second bearer associated with a lower scheduling weight.

3. The method of claim 1, wherein the scheduling weight is determined using a weighting function that is tuned according to resource utilization data or user experience data.

4. The method of claim 3, wherein the resource utilization data indicates a load of a network; and
   wherein the user experience data includes at least one of: data related to one or more performance indicators, or level of user experience provided by the user of the UE.

5. The method of claim 3, further comprising:
   generating a model for determining the weighting function, wherein the model is trained using information that includes a plurality of associations between the QoS flow identifier, QoS configuration identifier, and the network slice identifier.

6. The method of claim 1, wherein the information is obtained from a mapping of the bearer to the QoS flow identifier, the QoS configuration identifier, and the network slice identifier.

7. The method of claim 1, wherein the bearer is established according to a QoS that is to be provided for a data flow of the communication session involving the UE, and
   wherein the QoS flow identifier identifies a particular data flow that is to receive a particular QoS.

8. A device, comprising:
   one or more processors configured to:
      obtain information associated with a bearer established for a communication session involving a user equipment (UE),
      determine a scheduling weight for the bearer based on the information,
         wherein the information includes a quality of service (QoS) flow identifier of a QoS flow, a QoS configuration identifier that identifies one or more QoS parameters of the QoS flow, and a network slice identifier; and
      cause resources to be allocated to the bearer according to the scheduling weight.

9. The device of claim 8, wherein the bearer is a first bearer, and
   wherein a higher scheduling weight for the first bearer indicates a greater likelihood that resources will be allocated to the first bearer relative to a second bearer associated with a lower scheduling weight.

10. The device of claim 8, wherein the scheduling weight is determined using a weighting function that is tuned according to resource utilization data or user experience data.

11. The device of claim 10, wherein the resource utilization data indicates a load of a network; and
    wherein the user experience data includes at least one of: data related to one or more performance indicators, or level of user experience provided by the user of the UE.

12. The device of claim 10, wherein the one or more processors are further configured to:
    generate a model for determining the weighting function, wherein the model is trained using information that includes a plurality of associations between the QoS flow identifier, QoS configuration identifier, and the network slice identifier.

13. The device of claim 8, wherein the information is obtained from a mapping of the bearer to the QoS flow identifier, the QoS configuration identifier, and the network slice identifier.

14. The device of claim 8, wherein the bearer is established according to a QoS that is to be provided for a data flow of the communication session involving the UE, and
    wherein the QoS flow identifier identifies a particular data flow that is to receive a particular QoS.

15. A non-transitory computer-readable medium storing instructions, the instructions comprising:
    one or more instructions that, when executed by one or more processors, cause the one or more processors to:
       obtain information associated with a bearer established for a communication session involving a user equipment (UE),
       determine a scheduling weight for the bearer based on the information,
          wherein the information includes a quality of service (QoS) flow identifier of a QoS flow, a QoS configuration identifier that identifies one or more QoS parameters of the QoS flow, and a network slice identifier; and
       cause resources to be allocated to the bearer according to the scheduling weight.

16. The non-transitory computer-readable medium of claim 15, wherein the bearer is a first bearer, and
    wherein a higher scheduling weight for the first bearer indicates a greater likelihood that resources will be allocated to the first bearer relative to a second bearer associated with a lower scheduling weight.

17. The non-transitory computer-readable medium of claim 15, wherein the scheduling weight is determined using a weighting function that is tuned according to resource utilization data or user experience data.

18. The non-transitory computer-readable medium of claim 17, wherein the resource utilization data indicates a load of a network; and
    wherein the user experience data includes at least one of: data related to one or more performance indicators, or level of user experience provided by the user of the UE.

19. The non-transitory computer-readable medium of claim 17, wherein the one or more instructions, when executed by one or more processors, cause the one or more processors to:
    generate a model for determining the weighting function, wherein the model is trained using information that includes a plurality of associations between the QoS flow identifier, QoS configuration identifier, and the network slice identifier.

20. The non-transitory computer-readable medium of claim 15, wherein the information is obtained from a mapping of the bearer to the QoS flow identifier, the QoS configuration identifier, and the network slice identifier.

* * * * *